(12) United States Patent
Poledna (10) Patent No.: US 12,222,695 B2
(45) Date of Patent: Feb. 11, 2025

(54) METHOD TO GENERATE SAFE CONTROL DATA FOR A LOCAL MACHINE

(71) Applicant: TTTech Computertechnik Aktiengesellschaft, Vienna (AT)

(72) Inventor: Stefan Poledna, Klosterneuburg (AT)

(73) Assignee: TTTech Computertechnik Aktiengesellschaft, Vienna (AT)

( * ) Notice: Subject to any disclaimer, the term of this patent is extended or adjusted under 35 U.S.C. 154(b) by 575 days.

(21) Appl. No.: 17/654,134

(22) Filed: Mar. 9, 2022

(65) Prior Publication Data

US 2022/0300631 A1    Sep. 22, 2022

(30) Foreign Application Priority Data

Mar. 16, 2021    (EP) .................................... 21162856

(51) Int. Cl.
*G05B 19/048* (2006.01)

(52) U.S. Cl.
CPC .................. *G05B 19/048* (2013.01)

(58) Field of Classification Search
CPC .................................................. G05B 19/048
See application file for complete search history.

(56) References Cited

U.S. PATENT DOCUMENTS

2019/0371175 A1    12/2019    Joos

OTHER PUBLICATIONS

European Search Report of EP Application No. 21162856.5 dated Sep. 2, 2021.
Liu Tingting, et al., "Martingale Theory-Based Optimal Task Allocation in Heterogeneous Vehicular Networks", IEEE Access, vol. 7, Sep. 11, 2019, pp. 122354-1222366 (13 pages).
Georgios L. Stavrinides, et al., "Cost-Effective Utilization of Complementary Cloud Resources for the Scheduling of Real-Time Workflow Applications in a Fog Environment", 2019 7th International Conference on Future Internet of Things and Cloud (FICLOUD), IEEE, Aug. 26, 2019, pp. 1-8. (8 pages).

*Primary Examiner* — Mathew Franklin Gordon
(74) *Attorney, Agent, or Firm* — Eversheds Sutherland (US) LLP (57) ABSTRACT

A method and system to generate safe control data to control and/or to supervise a local machine, wherein a local software application is executed on a safe hardware device and executes calculations based input data to generate said safe control data, wherein a software application is executed on a hardware external to the safe device and sends a request to the cloud application to execute one or more defined calculations and said specific input data, which is to be used by the at least one cloud application for the execution of the one or more defined calculations, wherein the control data is determined to be safe or unsafe, and wherein if the control data are not received timely they will not be used to control and/or supervise the local machine.

16 Claims, 8 Drawing Sheets

METHOD TO GENERATE SAFE CONTROL DATA FOR A LOCAL MACHINE

CROSS-REFERENCE TO RELATED APPLICATIONS

This application claims priority to and the benefit of European Application No. 21162856.5, filed Mar. 16, 2021, which is hereby incorporated by reference herein in its entirety.

FIELD

The invention relates to a method to generate safe control data to control a local machine, for example a technical apparatus, such as a vehicle, in particular an automobile, wherein a safe device is assigned to the local machine, wherein said safe device comprises a safe hardware device, which safe device is provided with input data related to the local machine, wherein said safe device comprises a local software application, which is executed on the safe hardware device of the safe device, wherein the local software application is a safe software application, which local software application executes calculations based on said input data to generate said safe control data, which safe control data for example are control data being in accordance with safety requirements for the local machine.

Furthermore, the invention relates to a system for executing a method according to the invention to generate safe control data to control a local machine, for example a technical apparatus, such as a vehicle, in particular an automobile, wherein the system comprises a safe device, which is assigned to the local machine, wherein said safe device comprises a safe hardware device, which safe device is provided with input data related to the local machine, and wherein said safe device comprises a local software application, which is executed on the safe hardware device of the safe device, wherein said local software application is a safe software application, which local software application is configured to execute calculations based on said input data to generate said safe control data, which safe control data for example are control data being in accordance with safety requirements for the local machine.

BACKGROUND

In order to control a machine, a so called "local machine", a lot of software is used today. This software is executed on local hardware of the local machine, such as a local CPU and memory, to calculate the behavior of the local machine. For example, the software executes calculations to generate control date based on which control data the local machine is control and/or supervised. Usually, a number of sensors is provided which are monitoring the local machine and/or physical processes running on/in the local machine and/or the environment in which the local machine is located. Based on this monitoring the sensors provided input data to the software, which executes the calculations as described above. The control data delivered by said calculations are typically transmitted to a number of actuators which are controlling the local machine (the movement, physical processes on the local machine, etc.) based on said control data.

We denote a software which is being executed on a local hardware of the local machine to generate control data for the local machine, in particular for actuators of the local machine, as "local software application".

For example, a local machine may be a robot in a factory, a moveable device, such as a vehicle (automobile, . . . ) or an airplane. Examples for physical processes are the control of conveyor belt speed and robotic arms in factories, trajectories and speed of vehicles, as well as the controls of valves and other devices that can be controlled by electronic means and motors. These actuators are controlled in a way that the local machine is controlled according to its safety requirements. This means that the local machine works according to control data which are within a defined, so-called "safe" parameter range (according to the safety requirements), wherein said control data have to be provided within a defined time limit (according to the safety requirements), so that the actuators can be controlled in good time, depending on the local machine, in particular the actual state of the local machine, and/or the environment of the local machine, in particular the local machine in relation to its environment.

Some of the software used to generate control data may be part of safety critical or safety relevant functions. In an automobile, for example, automated cruise control is a safety critical/relevant function.

In general, control data that ensure that a local machine controlled according to these control data is operated safely, i.e. according to the safety requirements of the local machine, is referred to as "safe control data". In this context, it should be noted that the safety requirements, in particular a safe parameter range for control data, and the defined ("safe") time limit within which the control data must be provided, for example transmitted to the actuators, depend on the respective local machine (automobile, robot, . . . ), in particular its specification, and/or on the specific state/situation, in which the local machine is operated at the respective moment under consideration, etc.

Control data which allow the local machine to be safely operated, i.e. according to its safety requirements, are denoted as "safe control data".

For example, "safety" or "safe operation" means the absence of catastrophic consequences on the user(s) of a local machine and on the environment of the local machine (A. Bondavalli, S. Bouchenak, H. Kopetz (Eds.), *Cyber-Physical Systems of Systems*, Springer, 2016). Accordingly, "safe operation" of a local machine means that the local machine is operated in a way that no catastrophic consequences can occur. Control data which ensure that the local machine is safely operated are denoted as "safe control data", as mentioned above.

As explained above, safety requirements may be provided for a local machine. In order for control data to represent safe control data, the control data must meet the safety requirements of the local machine. In any event the use of "safe" control data prevents the local machine from entering an unsafe state, in which the local machine would not be operated safely, for example not under the conditions contained in a specification of the local machine and of its environment.

In order to ensure safety, software in general, or in particular a local software application, must be developed according to rigorous software design rules as for example defined in the ISO 26262 standard. In particular, said ISO 26262 standard defines Automotive Safety Integrity Levels (ASIL) from ASIL A (least critical ASIL) to ASIL D (most critical ASIL). In order to ensure safety, hardware or a device in general, must be developed according to rigorous software design rules as for example defined in the ISO 26262 standard. In particular, said ISO 26262 standard defines Automotive Safety Integrity Levels (ASIL) from ASIL A (least critical ASIL) to ASIL D (most critical ASIL).

A software (or software application) which is designed to generate safe control data is denoted as "safe software".

A hardware which is designed to generate safe control data is denoted as "safe hardware".

A device which is designed to generate safe control data is denoted as "safe device". A safe device is for example a safe hardware or comprises a safe hardware, or is (or comprises) a safe hardware and a software running on said safe hardware, in particular a safe software.

In order to get the best and most efficient results of calculations executed by the software a lot of data, in particular input data are considered that must be processed in sometimes highly complex calculations. Unfortunately, the local available hardware (e.g., an Electronic Control Units—ECUs) is often limited regarding processing power and available memory. Other limitations like heat generated and available energy may apply as well.

As these local hardware, such as ECUs, is typically connected via network connections, it is possible to store and process certain data in the cloud. This may especially refer to data that are not time critical and are, for example, needed for optimizing production processes in factories or routes of vehicles based on the traffic situation. As these data are not safety critical/relevant for the operation of the local machine, a certain preprocessing may even take place in the cloud and thus the local hardware may be relieved from this burden.

Unfortunately, a network connection to the cloud will not be reliable enough to satisfy a certain safety requirement of the local machine. Nevertheless, it would be preferable to outsource as much processing power and memory requirement to the cloud also including safety-critical and safety-related computations/calculations.

SUMMARY

It is an objective of the invention to enable the use of control data for the local machine which are calculated external to the local machine, for example by a software located in the cloud, while still guaranteeing the safe operation of the local machine.

This objective is achieved with a method described above, wherein at least one software application in the cloud, a so-called "cloud application", is provided, which at least one cloud application is a software application which is executed on a hardware external to the safe device, in particular external to the local machine, wherein said at least one cloud application is configured to execute calculations to generate control data for controlling and/or supervising the local machine based on specific input data provided by the local software application to the at least one cloud application, wherein the local software application sends a request, for example in one or more request messages to the at least one cloud application, wherein said request comprises information about which one or more defined calculations are to be executed by the at least one cloud application and said specific input data, which is to be used by the at least one cloud application for the execution of the one or more defined calculations, and wherein if the local software application and/or the safe device receives control data of the one or more requested defined calculations within a defined period of time or before a defined point in time from the at least one cloud application, it is checked, for example by the local software application or by the safe device, for example by a checking software executed on the safe hardware device of the safe device, if said control data are within a safe parameter range, and if said control data are within the safe parameter range, the control data are qualified as safe control data and will be used to control the local machine in addition to or instead of the safe control data generated by the calculations executed by the local software application, and if said control data are not within the safe parameter range, said control data will not be qualified as safe control data and will not be used to control the local machine and only the safe control data generated by the calculations executed by the local software application are used to control the local machine, and wherein control data provided by the at least one cloud application, which are not received by the local software application and/or the safe device within the defined period of time or before said defined point in time will not be used to control the local machine, and only the safe control data generated by the calculations executed by the local software application are used to control the local machine.

This objective is also achieved with a system described above, wherein the system further comprises a hardware external to the safe device, in particular external to the local machine, and at least one software application in the cloud, a so-called "cloud application", which at least one cloud application is a software application which is executed on said external hardware, wherein said cloud application is configured to execute calculations to generate control data for controlling and/or supervising the local machine based on specific input data provided by the local software application to the cloud application, and wherein the local software application is configured to send a request, for example in one or more request messages to the at least one cloud application, wherein said request comprises information about which one or more defined calculations are to be executed by the at least one cloud application and said specific input data, which is to be used by the cloud application for the execution of the one or more defined calculations, and wherein the local software application and/or the safe device is/are configured to receive control data of the one or more requested defined calculations of if the local software application and/or the safe device receives control data of the one or more requested defined calculations within a defined period of time or before a defined point in time from the cloud application, it is checked, for example by the local software application or by the safe device, for example by a checking software executed on the safe hardware device of the safe device, if said control data are within a safe parameter range, and if said control data are within the safe parameter range, the control data are qualified as safe control data and will be used to control the local machine in addition to or instead of the safe control data generated by the calculations executed by the local software application, and if said control data are not within the safe parameter range, said control data will not be qualified as safe control data and will not be used to control the local machine and only the safe control data generated by the calculations executed by the local software application are used to control the local machine, and wherein control data provided by the cloud application, which are not received by the local software application and/or the safe device within the defined period of time or before said defined point in time will not be used to control the local machine, and only the safe control data generated by the calculations executed by the local software application are used to control the local machine.

Control data comprise one or typically more parameters. In order for a parameter to be classified as safe, it must be within certain limits/margins for the parameter values ("safe margin"), e.g. depending on the respective state of the local machine, and/or the environment of the local machine, etc. This range between the safe margin is called the "safe parameter range". Control data comprising more than one parameter may be classified as safe control data if all parameters are within its safe parameter range ("the control data are within the safe parameter range"). For example, in case the local machine is a vehicle, control data may comprise one or more of the following parameters: velocity, acceleration/deceleration, direction of movement, trajectories, . . . .

In addition, control data must be available in time so that the local machine can be safely controlled in the given situation. Accordingly, this control data must also be available within a defined period or before or by a defined time, which may depend on the respective situation. Control data which are within the safe parameter range and are provided timely represent safe control data.

The local software application, which is a safe software, is comprised by a safe device, which safe device comprises a safe hardware (device) on which the local software application is being executed. The term "safe" in this context denotes that the hardware on which the local application is executed and/or the safe device, as well as the local software, are preferably developed according to rigorous design rules as for example defined in the ISO 26262 standard. In particular, said ISO 26262 standard defines Automotive Safety Integrity Levels (ASIL) from ASIL A (least critical ASIL) to ASIL D (most critical ASIL).

Accordingly, the control data provided by the safe device are safe control data, as the safe device ensures that the control data generated are within the safe parameter range and are provided timely.

The present invention provides a method to integrate cloud computations/calculations into the calculation of the behavior of a local machine without losing the required safety for critical functions that allow the machinery to operate according to its safety requirements as required by the specific kind of application.

The local software application itself may provide the safe margins for control data of the cloud application and/or the defined period of time (or the defined point in time), or a different, additional software such as an additional software of the safe device may provide the safe margins and/or the defined period of time (or the defined point in time).

The checking whether the control data of the cloud are received within the defined period of time (or until the defined point in time) and/or the check whether said control data are safe control data or not may be checked by the local software application and/or by the safe device, for example by a specific checking software being executed in the safe device, preferably on the safe hardware device of the safe device. Said checking software may be a specific software or this function may be realized by the additional software mentioned above.

According to the invention, a local software application running on a safe hardware device, which is configured to generate safe control data by executing calculations, "outsources" one, more or all of said calculations which it is executing to an external cloud application. The local machine, in particular the local application, sends a request to the external cloud application and expects a result within a defined period of time or until a defined point in time. This time period or point in time is specific for the specific request, in particular on the calculations to be executed by the cloud application, as it depends on the (time-)criticality of the function or the control data required.

The local software application on the one hand is configured to calculate safe control data by itself, on the other hand it is configured to calculate safe margins or a safe parameter range, for example a range/domain of values for the control data, wherein control data within this range/domain are classified as safe control data.

The local software application expects the results, namely the control data generated by the cloud application, within a defined period of time (or until a defined point in time). Usually, this period of time (or said point in time) is a priori known to the local software application. However, it may also be provided that the local software application is configured to calculate the "defined" period of time (or said defined point in time), so that for example actual circumstances may be taken into account which may allow differing periods of time (or differing points in time), depending on the actual situation/state of the local machine.

Typically, said defined period of time starts from a defined starting-point in time. For example, said defined starting-point in time is a point in time when the request is started to being transmitted to the cloud application(s) or a point in time at which the request has left the local application or safe device.

Instead of a defined period of time it may be provided that the control data generated by the cloud application have to arrive until a defined point in time, wherein it may be provided that said defined point in time is a fixed point in time, or it may be provided that the local application calculates specific defined points in time for some requests or for each request.

In the further description, if the invention is described based on a defined period of time, the invention will work in analogy when using a defined point in time instead of the defined period of time.

According to the invention only safe control data are used to control and/or supervise the local machine—in case that none of the requested defined calculations of the cloud application deliver control data which are received within the defined period or until the defined point in time, or none of the defined calculations deliver control data received within the defined period or until the defined point in time are within the safe parameter range, only safe control data generated by the local software application are used to ensure that the local machine operates within safe parameters.

In the following, preferred embodiments of the invention (method and system), which alone or in any arbitrary combination may be provided, as described.

For each defined calculation a specific defined period of time or a specific defined point in time may be provided, or only one defined period of time or only one defined point in time is provided for all calculations.

Defined calculations may be distinguished from each other by the kind of calculation and/or by the "point" in time where the calculation is being executed (or by the point in time where the result of the calculation is required).

For example, a first calculation delivers control date for a first set of actuators and an second calculation delivers control data for a second set of actuators, so these two calculations differ in the "kind" of calculation.

Furthermore, for example, the results/control data of the first calculation (first kind of calculation) are always expected within the same period of time—in this case, two "first calculations" executed at different times are not distinguishable from each other. However, it may also be provided that the results of a first calculation executed now will be expected sooner/or later than the same first calculation being executed later. In this case, these first calculations are different defined calculations.

The external hardware for a cloud application may be a safe hardware and/or the cloud application may be a safe software application.

However, preferably the external hardware for the cloud application is an unsafe hardware and/or the cloud application is an unsafe software application, i.e. it is/are not developed according to the safety standards of the safe device and/or the safety standards of the local application. In this case a more performant hardware and/or software may be easier and/or cheaper be provided.

The external hardware on which a or the at least one cloud application is executed may be more powerful than the safe hardware device and/or the at least one cloud application may be more powerful than the local software application.

It may be provided that the safe parameter range is calculated by the local software application, for example based on the input data related to the local machine.

It may be provided that the local software application or the safe device, for example the checking software, checks for each requested defined calculation separately if the calculation results are within the safe parameter range.

If the results of certain calculations are received within the defined period of time or until a defined point in time, but not all results are within the safe parameter range, at least some results, that of the calculations within the safe parameters range, may be used for controlling and/or supervising the local machine. Another option may be that in case that only one result of a defined calculation contained in a request is not within the safe parameter range, none of the results of said request may be used.

The at least one cloud application may be configured to execute at least some, preferably all of the calculations which can be executed by the local application.

The cloud application may be identical to the local software application. The cloud application may be configured such that is capable of executing only a part of the calculations which the local software application is configured to execute. The cloud application may be configured such that it is capable of executing the same calculations as the local software application is configured to execute and, in addition may be configured to execute additional calculations, which cannot be executed by the local software application.

In the case that a specific calculation can be executed by the local software application and the same calculation can be executed by the cloud application, we denote these calculations as "corresponding calculations".

A specific calculation being executed by the cloud application, using the same input data as the corresponding specific calculation being executed by the local software application, will (in a fault-free situation) at least deliver the same output, e.g. the same control data as said corresponding calculation executed by the local software application. Typically, since the cloud application will be more powerful and/or is executed on a more powerful hardware than the local software application, the specific calculation executed on the cloud application will typically deliver its output faster than the local software application and/or the output of the cloud application will be more refined.

The control data provided by a specific calculation of the at least one cloud application, which are qualified as safe control data, may be used instead of results of calculations executed by the local software application, in particular of results of a corresponding calculation executed on the local software application.

The control data provided by a specific calculation of the at least one cloud application, which are qualified as safe control data, may be used in addition to the results of calculations of the local software application, in particular of the corresponding calculation executed on the local application.

It may be provided that the input data related to the local machine and/or the specific input data comprises
sensor data from one or more sensors (e.g., cameras, radars, lidars, . . . ) monitoring the surrounding of the local machine; and/or
sensor data from one or more sensors (e.g., cameras, radars, lidars, . . . ) monitoring the local machine and/or monitoring processes being executed on the local machine; and/or
data describing the state of the local machine, for example data being provided by one or more actuators of the local machine, subsystems of the local machine, etc., or configuration data of the local machine, etc.
wherein preferably the specific input data is identical to the input data related to the local machine or comprises all input data related to the local machine or the specific input data is a proper subset of said input data related to the local machine. A proper subset of a set A is a subset of set A that is not equal to set A.

The specific input data may comprise information about the safe device and/or about the local software application, in particular about the type of local application.

This allows the cloud application to recognize which functions/calculations the local software application has to execute and knows which actuators of the local machine have to be controlled. In particular this may be of advantage in the case that different safe devices, for example different safe devices of different local machines, are provided, wherein the same local application is being executed on said different safe devices. In this case, one cloud application may execute calculations and provide control date for two or more local applications running on different safe devices.

Two or more cloud applications may be provided, which are configured to execute different calculations, wherein preferably a request message is routed to a defined cloud application according to the specific input data contained in the request message, in particular with respect to information about the safe device and/or the local software application.

Thus, the request can be routed to the appropriate cloud application that is configured regarding the capabilities of the device overall and the intended purpose of the local software application.

Preferably, one or at least one distribution unit is provided in the local machine, or external to the local machine, for example in the cloud, via which a local software application can communicate with one or more cloud applications.

As described above, a cloud application may execute calculations for two or more identical local software applications, which are executed on different safe devices.

It may also be provided that a local software application is communicating with two or more cloud applications, wherein the different cloud applications may execute different calculations for the local software application. It may also be provided that the two or more cloud applications execute the same calculations so that the local software application can decide which results to use (for example based on the point in time at which the control data are received and/or depending on the "quality" of the control data).

It may also be provided that exactly one cloud application is provided which is configured to execute all calculations of the local software application.

Preferably it is provided that the safe device is part of the local machine.

It may be provided that the cloud application is a software application which is connected to the local software application via the Internet.

Furthermore, it may be provided that as an answer to a request message of a local software application a cloud application sends a response message to the local software applications, wherein said response message comprises the control data of the defined calculations requested by the local software application.

For example, the message may contain control data for one or more actuators of the local machine, which control data will be verified by the local software application and will be used, if the control data for the actuators are qualified as safe control data and thus can guarantee to keep the behavior of the local machine within safe boundaries.

It may be provided that a response message from a cloud application contains information which indicates if this is the final message of the cloud application or if the cloud application intends to send one or more additional response messages.

Control data, which are received by a partial response from the cloud application may be used by the local software application to control and/or supervise the local machine, if said control data are qualified as safe control data.

The control data calculated by the cloud application for one specific calculation request are transmitted to the local application by one or more response messages. The sum of all response messages, which is necessary to transmit all control data for a specific request, is called "response". (In case that all control data for a specific calculation request are transmitted by only one response message, said response message represents "the response".)

In case that the response comprises two or more response messages, and the local software application has already received at least one, but not all of the response messages, the local software application has received a so-called "partial response".

Now, in case of the receipt of a partial response, as long as the machine works within safe parameters, the control data contained in said partial response may be qualified as safe control data and may be used to control and/or to supervise the local machine.

It may be provided that the cloud application is notified by a termination message, which preferably is sent by the requesting local software application, that no further calculation is required, wherein preferably said termination message includes information about the reason for the termination, such as that for example the defined time-period has been exceeded and/or that received calculation results are not within the safe parameter range, and/or preferably contains an actual status achieved by the local machine.

Preferably it is provided that the cloud application takes additional input, in particular additional input data, into account for its calculation(s), wherein said additional input, in particular additional input data is available for the cloud application but not for the local software application.

Such additional input or additional data may comprise, for example, overall configuration data for different devices (such as the local machine and other devices, which are acting jointly, but which are not directly connected, so that the local machine has no or only limited information about the other device(s)), optimization of routes for the local machine based on traffic and track information (for example, if the local machine is an automobile), information with respect to synchronization of different devices (such as the local device) based on available resources, etc., so that the quality of the control data provided by the cloud application can be improved with respect to corresponding control data provided by the local application.

In a manufacturing plant different devices (local machines) such as conveyors, valves, gripper arms, etc. are provided. Usually, all these devices work together, but they may not necessarily be directly connected to each other. The same can be true for vehicles.

Control data provided by a cloud application, which use additional input data as described above may help to coordinate the collaboration of such devices.

If, for example, a vehicle or a warehouse machine needs to be moved from point A to point B, there may be multiple paths. One path may be blocked, which is not known to the local software application of the device (=local machine), or one of the paths may be more optimal, which is also only known to the cloud application through the additional input data. So while the local software application cannot take this information (additional input data) into account in its calculations, the cloud application can take it into account. Accordingly, the control data provided by the cloud application can be better than the control data determined by the local software application with its corresponding calculation.

Additionally the cloud application may have additional data available in the cloud that may lead to different results, that are in the safe range as well. These data may be preferred, when they are received in the required time frame.

The local software application has to ensure a safe operation of the local machine. This is highly dependent on the type of local machine. For a vehicle, this may mean that it must come to a stop if the local software application does not support a safe operation. For a conveyor belt in a factory, a continued operation at a constant speed may still be possible.

Control data delivered by the cloud application may improve the behavior of the local machine. For example, a car driving along a road can follow this road at a constant speed without additional control data from the cloud application. If an obstacle occurs that cannot be avoided, it may be necessary to park the car at the side of the road (safe state). In the cloud, the obstacle could be known and control data from the cloud application may direct the vehicle to an alternative route without this obstacle.

In a factory, a conveyor belt is operated at a constant speed as long as there is no congestion on subsequent belts and the belt has to be brought to a halt until this congestion has eased. With the use of control data from the cloud application the speed of the belt could be adapted in time, as the cloud application may know the overall situation better, thus avoiding a jam.

BRIEF DESCRIPTION OF THE DRAWINGS

In the following, in order to further demonstrate the present invention, illustrative and non restricting embodiments are discussed, as shown in the drawings, which show.

DETAILED DESCRIPTION

We discuss some of the many implementations of the invention next. If not stated otherwise, all details described in connection with a specific example are not only valid in connection with this example, but apply to the general scope of protection of the invention.

Figure 1:
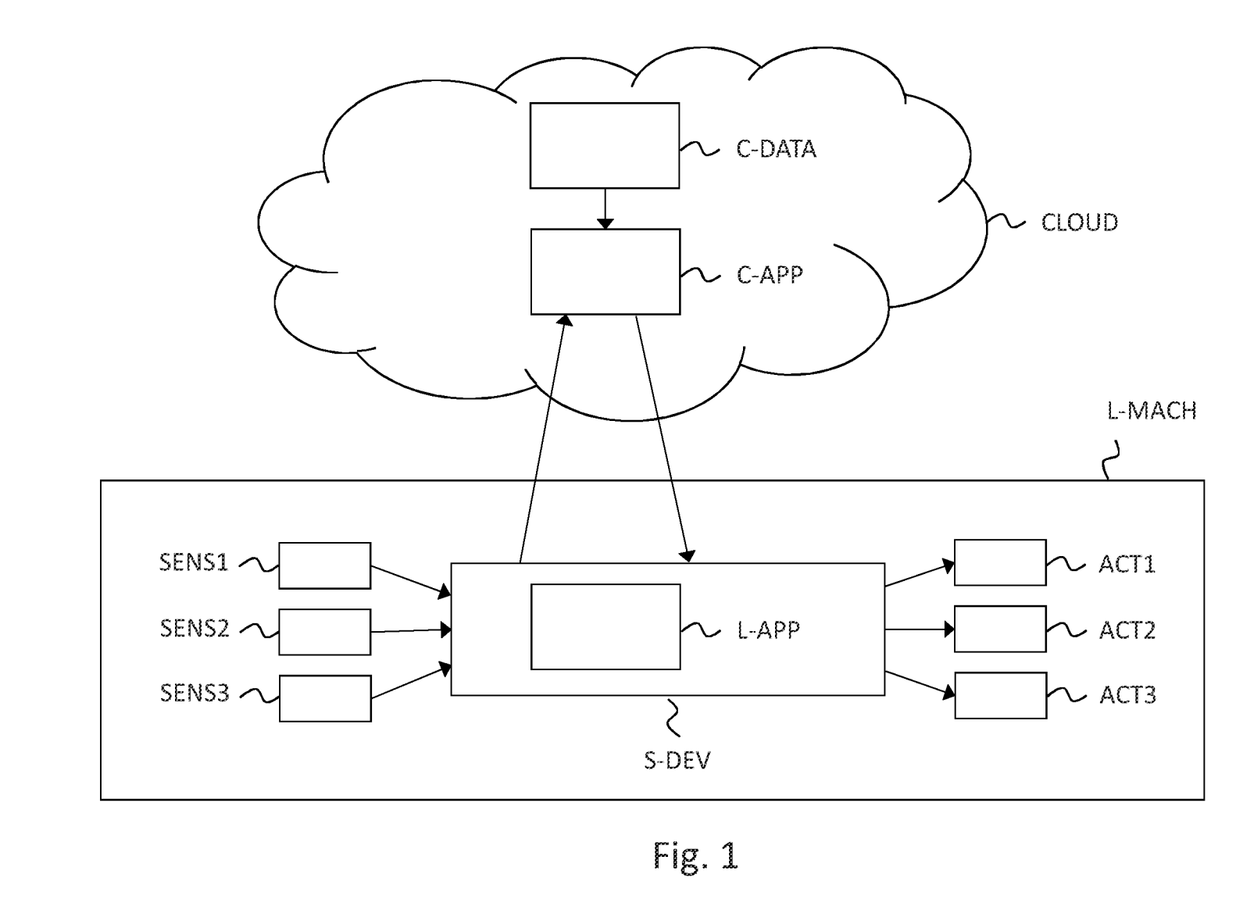
FIG. 1 a system according to the invention.

As shown in FIG. 1 a local machine L-MACH comprises at least one safe device S-DEV which is connected to one or more sensors SEN1-SEN3, . . . as well as to one or more actuators ACT1-ACT2, . . . .

The one or more sensors SEN1-SEN3 is/are monitoring, for example, the local machine and/or the surrounding of the local machine and/or physical processes running on the local machine, etc., and are providing sensor data for the safe device S-DEV. These sensor data are used to generate control data for controlling and/or supervising the local machine L-MACH.

FIG. 1 further shows that the safe device S-DEV comprises at least one local software application L-APP, which is executed on the safe device, in particular on a safe hardware device of the safe device S-DEV. The local software application L-APP is configured to generate, based on input data (which input data are data, in particular all data delivered by the sensors, for example the raw sensor data or pre-processed sensor data) so called "safe control data" as described in the introduction of the present document. These safe control data are used to control and/or supervise the local machine L-MACH in that the local software application (or the safe device S-DEV) provides the safe control data to the actuators ACT1-ACT3.

Furthermore, at least one cloud application C-APP is provided, the cloud application and the safe device S-DEV as described above forming a so-called "system" SYS. The cloud application C-APP is a software application which is being executed on a hardware which is external to the local machine L-MACH. In particular, the cloud application is located "in the cloud", which means that the cloud application is located on a remote hardware. Typically, the safe device and/or the local software application are communicating with the cloud application via the Internet.

As the local calculation resources (e.g. CPU, memory, power and temperature limits) of the safe device S-DEV typically are limited, in particular for executing complex calculations, the local application L-APP is configured to outsource calculations for generating control data to at least one cloud application C-APP and to use the results of the calculations of the cloud application, for example in that it includes the control data delivered by the cloud application C-APP into the control data it has calculated itself or in that it uses the control data of the cloud application C-APP instead of the control data generated by itself.

Typically, the cloud application and/or the hardware, on which it is executed, is more performant than the local software application L-APP and/or the safe hardware device, so that the cloud application may execute the calculations faster than the local software application and/or may deliver better results.

Additionally, the cloud application C-APP may have access to additional cloud data C-DATA, which provide additional information that can be taken into account by the cloud application for generating control data for the local machine L-MACH. These additional cloud data C-DATA, which are not available to the local software application, typically will help to improve the results of calculations of the cloud application.

In more detail, the cloud application C-APP executes the calculations as mentioned to generate control data for controlling and/or supervising the local machine L-MACH based on specific input data, which are provided by the local software application L-APP to the cloud application C-APP. The local software application sends a request to the cloud application C-APP, wherein said request comprises information about which one or more defined calculations are to be executed by the at least one cloud application and said specific input data, which is to be used by the cloud application C-APP for the execution of the one or more defined calculations.

The cloud application C-APP executes the required calculations according to this request and sends the results of the calculation, namely the calculated control data, in a response to the safe device S-DEV and/or the local software application L-APP. A response may comprise the results of one specific calculations or of two or more calculations. A response may consist of one or more messages which a transmitted to the safe device/local software application, in particular via the Internet.

The local application L-APP will take these control data in account and checks if these control data are within safe parameters, so that the local machine is still safely working when these control data are forwarded to the appropriate actuator. In this context, it is provided that if the local software application L-APP and/or the safe device S-DEV receives control data of the one or more requested defined calculations within a defined period of time from the cloud application C-APP, it is checked, for example by the local software application L-APP or by the safe device S-DEV, for example by a checking software executed on the safe hardware device of the safe device S-DEV, if said control data are within a safe parameter range. If said control data are within the safe parameter range, the control data are qualified as safe control data and will be used to control and/or to supervise the local machine L-MACH.

As described, it may be provided that as already described above in more detail, a defined period of time, which starts at a defined starting-point ts, is provided, and wherein only control data of the cloud application can be taken into account which arrive at the local application within this defined period of time. The starting-point ts may be linked to an event as described above (sending of the request) or may be specified by a time schedule, in particular by a cyclic time schedule.

Alternatively, instead of a defined period of time a defined point in time te may be provided, until which defined point in time te (also called "arrival-point in time") control data of the cloud application have to arrive in the local application so that they can be taken into account. Said arrival point in time te may be a fixed point in time, it may depend on the specific calculation, and/or it may be specified by a time schedule, in particular by a cyclic time schedule.

If said control data are not within the safe parameter range, said control data will not be qualified as safe control data and will not be used to control and/or to supervise the local machine L-MACH.

If the control data provided by the cloud application C-APP are not received by the local software application L-APP and/or the safe device S-DEV within the defined period of time or until the specific defined point in time, they will not be used to control and/or supervise the local machine L-MACH.

Figure 2:
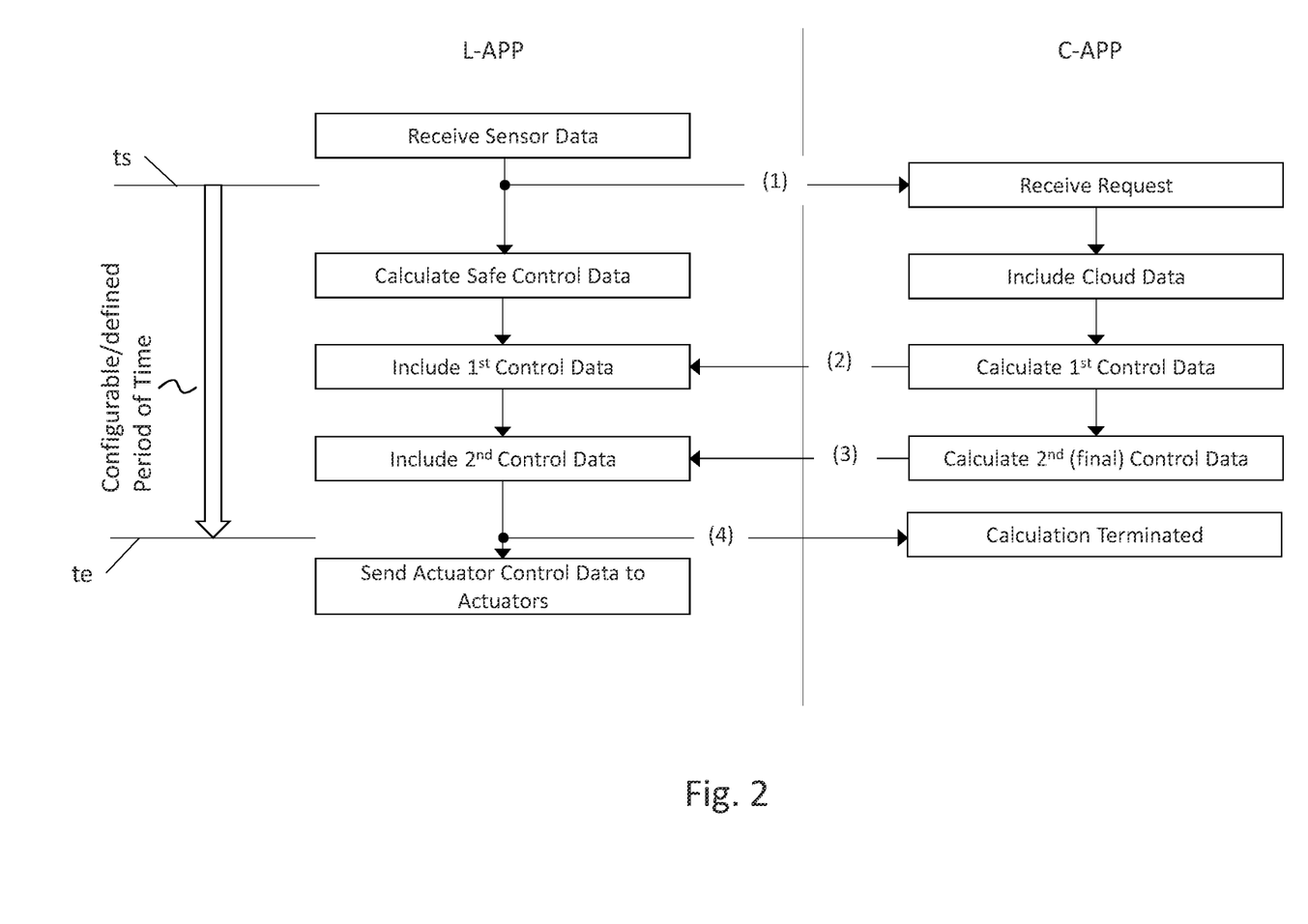
FIG. 2 an example of a message flow according to the invention.

FIG. 2 shows an example of a message flow to implement the method according to the invention. Based on input, namely based on sensor data from the one or more sensors SENS1-SENS3, the local application L-APP executes a calculation for generating safe control data for the one or more actuators ACT1-ACT3. The start of the calculation may be triggered by the receipt of the input. Alternatively the start of the execution of a calculation by the local application L-APP may be triggered based on a time schedule.

According to the invention the local application L-APP sends a request message (1) with the content as described above to the cloud application. The request message may include information of the device type of the safe device (and/or the local machine) and/or the type of the local software application in order to—in the case that two or more cloud applications are provided—be able route the message to the correct cloud application C-APP.

Based on the available input data the local software app L-APP starts to calculate the required safe control data for the actuators ACT1-ACT3 to control and/or supervise the local machine L-MACH.

The defined period of time within which at least a partial response from the cloud application C-APP comprising at least some control data is expected starts at a defined point in time, for example at the point in time when the sending of the request is started.

Additionally, the local software application calculates a safe parameter range, within which safe parameter range the control data of the cloud application have to be located.

The cloud application receives the request of the local application and starts to execute the requested calculation(s) using the specific input included in the request.

Optionally, if present, additional cloud data C-DATA may be included in the calculation(s) of the cloud application.

In the example shown, the cloud application calculates $1^{st}$ control data, for example control data for the first actuator ACT1. These $1^{st}$ control data are transmitted to the local application L-APP by a response (2), in particular by a partial response and are received within the defined period of time in the local application. The local application checks if said control data of the cloud application are within the safe parameter range, and if this check is positive, the $1^{st}$ control data are qualified as safe control data and will "included" in the safe control data, that means that these $1^{st}$ control data will be used instead of or in addition to the or some of the safe control data calculated by the local application, for example to control the first actuator ACT1.

According to the example shown in FIG. 2, the cloud application further calculates $2^{nd}$ control data, which are sent to the local application (3), in particular by a further partial response. Again, these control data are received within the defined period of time in the local application and accordingly are checked if they are within the safe parameter range. If the check is positive these $2^{nd}$ control data are safe control data and will also be used to control/supervise the local machine in that the safe control data are transmitted to the relevant actuators, for example to the actuators ACT2, ACT3.

In this example, the response consists of two partial responses (2), (3).

Preferably, the cloud application C-APP is informed by the local application, for example about the—in this example—successful incorporation of the calculated control data for the actuators, by a termination message (4).

The "final" safe control data for the actuators, that is the safe control data generated by the local application and the included $1^{st}$ and $2^{nd}$ control data are transmitted to the actuators by the local application. With respect to the meaning of "including" it is referred to the explanation above, which may mean that in one extreme case the safe control data for the actuators comprise the safe control data generated by the local application and all control data generated by the cloud application, and in the other extreme example may mean that all safe control data generated by the local application are replaced by control data generated by the cloud application. Clearly, all possible variations between these extreme positions may be possible.

Figure 3:
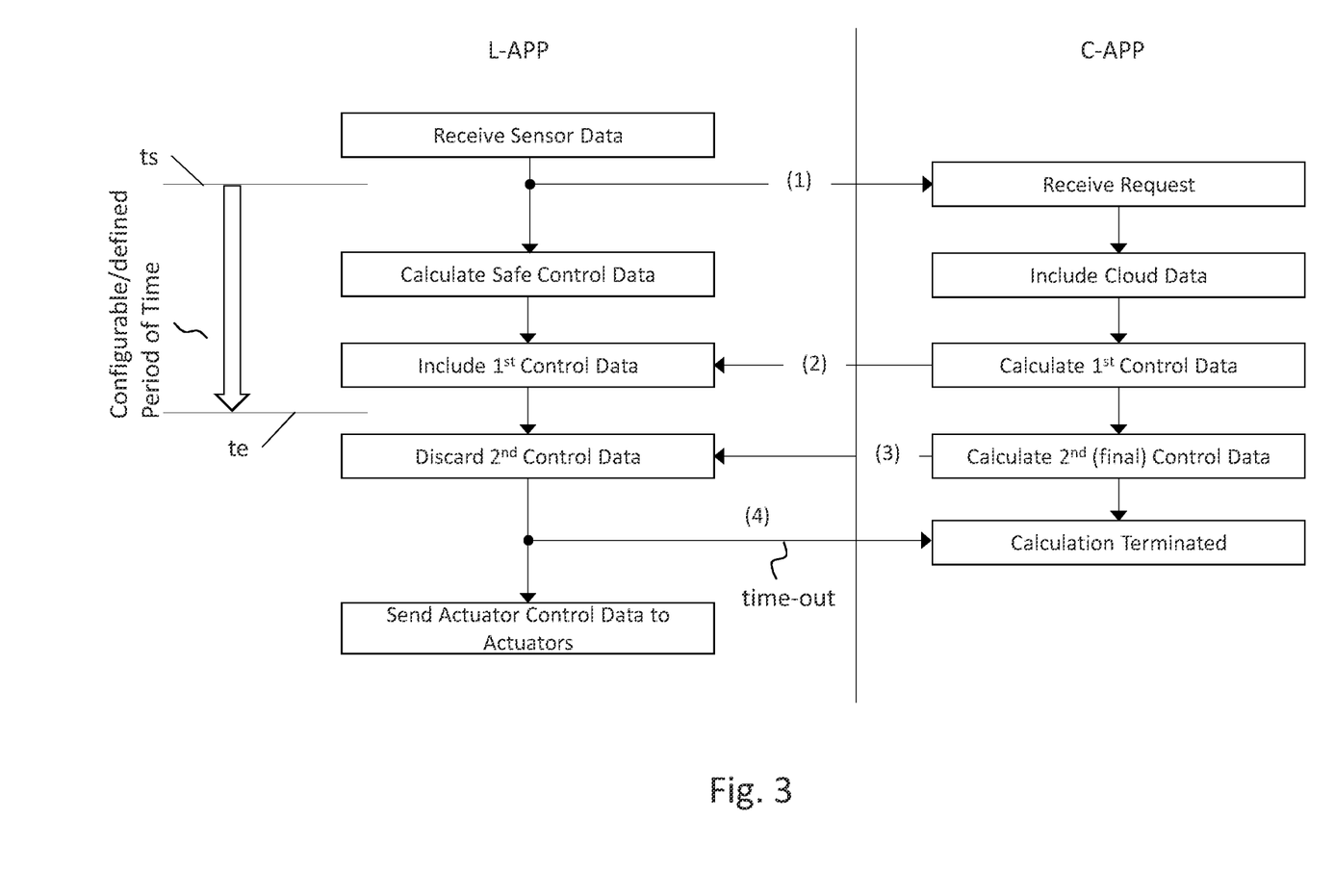
FIG. 3 another example of a message flow according to the invention.

FIG. 3 shows another example of a possible message flow. In this case the configurable/defined period of time is expired before the $2^{nd}$ (final) partial response from the cloud application C-APP is received (3). The local application will take the ($1^{st}$) control data (step (2)) for one or more actuators, which have been received by the local application timely, into account and check, if these $1^{st}$ control data are within the safe parameter range. The $2^{nd}$ control data are discarded by the local application.

The local application L-APP may or will adjust the safe control data for the actuators by including (see the definition of "including" above) the $1^{st}$ control data of the cloud application and preferably sends a termination message (4) to the cloud application C-APP. This termination message will inform the cloud application that no further data are required, preferably including a reason (e.g. that the period of time is timed-out) and/or the status of the local application, or safe device, or local machine.

The "final" actuator control data are transmitted to the actuators.

Figure 4:
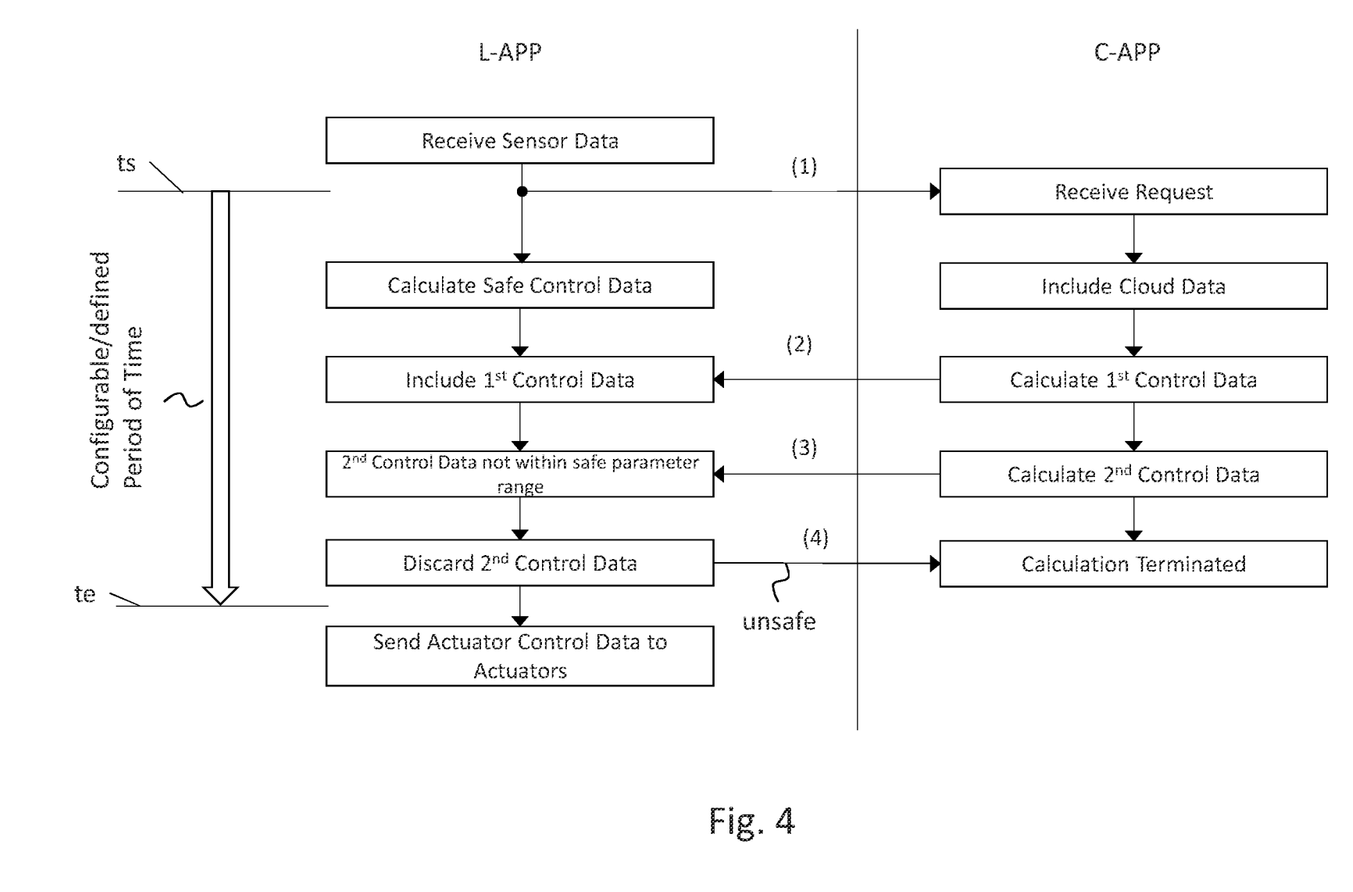
FIG. 4 yet another example of a message flow according to the invention.

FIG. 4 shows yet another example of the message flow. In this case the local application receives all partial final responses (2), (3) within the configured/defined period of time, but detects that the $2^{nd}$ control data are delivered by the cloud application C-APP are not within the safe parameter range.

Accordingly, the $2^{nd}$ control data will be qualified as unsafe control data and will not be used to control/supervise the local machine.

In this case the local application will only "include" the $1^{st}$ control data and send the final actuator control data to the actuators. Preferably, the local application will send a termination message (4) to the cloud application C-APP with the reason that the control data, in particular the $2^{nd}$ control data lead to an unsafe state of the local machine. This may happen even before the final message (partial response) of the cloud application is received by the local application.

Figure 5:
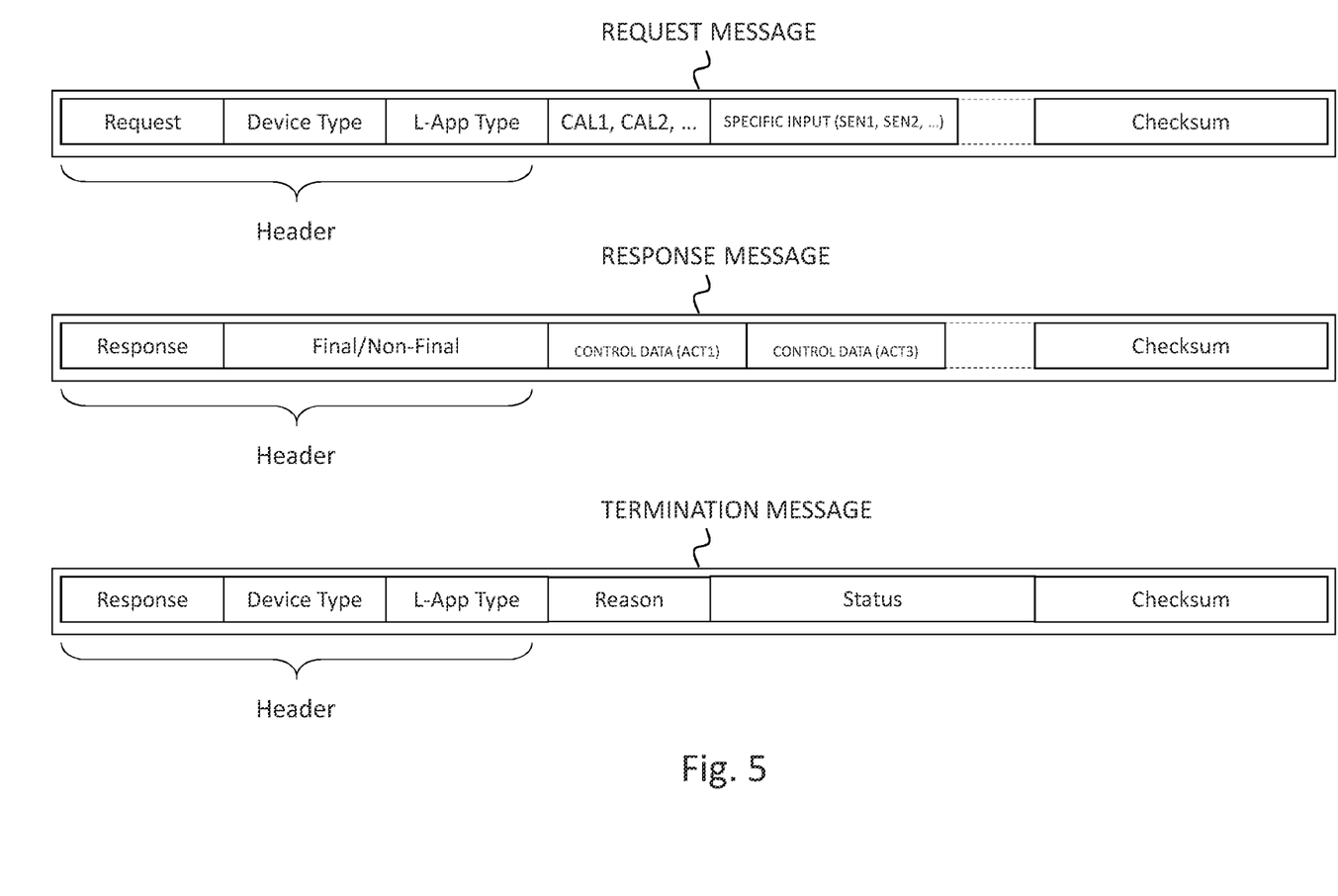
FIG. 5 an example of the structure of a request message, a response message and a termination message, FIGS. 6 and 6a an example of generating safe control data according to the state of the art, FIGS. 7 and 7a an example of generating safe control data according to the invention, and FIGS. 8 and 8a a further example of generating safe control data according to the invention.

FIG. 5 shows possible formats and content that may be part of a request message, response message and termination message.

The header of the request message may include a request-indicator that the message is a "request" message, the type of the safe device and the type of the local application sending the request. The indicator "L-APP Type" may already implicitly contain the information, which calculations are to be executed by the cloud application, or the calculations CAL1, CAL2, . . . are indicated in separate indicators in the message. Furthermore, the request message contains specific input based on which the cloud application has to generate control data by executing the requested calculations.

The header of the response message may include an response-indicator that the message is a "response" message, an indicator if this is a non-final or the final message for a specific request, and control data generated by the cloud application, for example control data for the $1^{st}$ and $3^{rd}$ actuator ACT1, ACT3.

Preferably, the request-indicator of the request messages or at least of one, in particular the first request message of one specific request comprises an identifier which identifier will be included into the response-indicator of the one or more response messages sent by the cloud application as reaction to the request messages of the specific request.

The header of the termination message may include an indicator that the message is a "termination" message, the type of the safe device and the type of the local application sending the termination message.

Furthermore, the termination message may contain a reason for the termination of the request and a status of the safe device.

Figure 6:
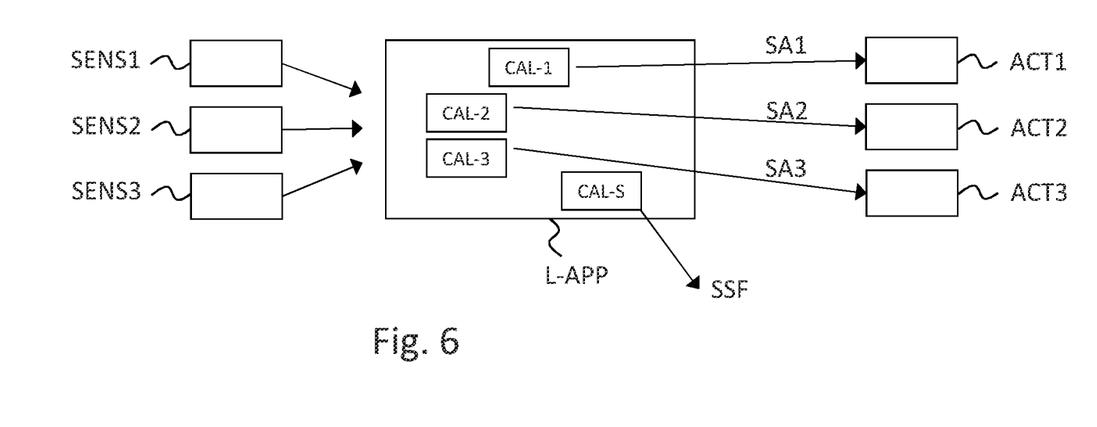

FIG. 6 shows the situation where only the local software application L-APP calculates safe control data for the actuators ACT1-ACT3 of the local machine. Safe control data means that the control data are, according to specific safety requirements, within a safe parameter range and are generated timely, so that they can be (or are) provided to the actuators in good time, so that a safe operation is ensured.

Figure 6A:
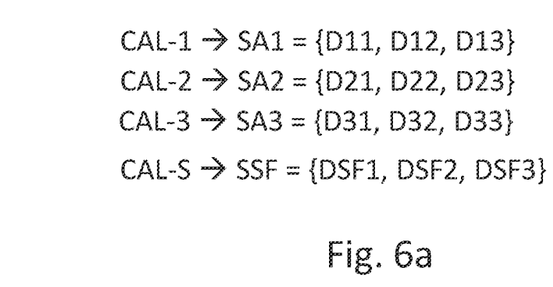

Based on input related to the local machine, provided by the sensors SEN1-SEN3, the local application in this simple, not restricting example, executes four different calculations, as is shown in FIG. 6a:

A first calculation, CAL-1, provides safe control data D11, D12, D13 for the first actuator ACT1. These control data form a first set SA1 of safe control data.

A second calculation, CAL-2, provides safe control data D21, D22, D33 for the second actuator ACT2. These control data form a second set SA2 of safe control data.

A third calculation, CAL-3, provides safe control data D31, D32, D33 for the third actuator ACTS. These control data form a third set SA3 of safe control data.

The sets SA1, SA2, SA3 are provided for "normal" safe operation of the local machine (e.g., a vehicle driving, . . . ). "Normal" operation in this context means a specified and intended operation of the machine in the actual state.

Alternatively, or as shown in the present example additionally, the local software application L-APP executes:

a fourth calculation, CAL-S, generating safe control data DSF1, DSF2, DSF3. These safe control data, which form a—in this case fourth—set SSF are provided to bring the local machine into a safe state if specific circumstances obviate that the local machine L-MACH is operating in normal safe mode. In this case the local software application L-APP transmits the set SSF to the actuators instead of one, more or all of the first, second and third sets.

FIGS. 6, 6a depict the case where only the local software application generates control data for the actuators of the local machine.

Figure 7:
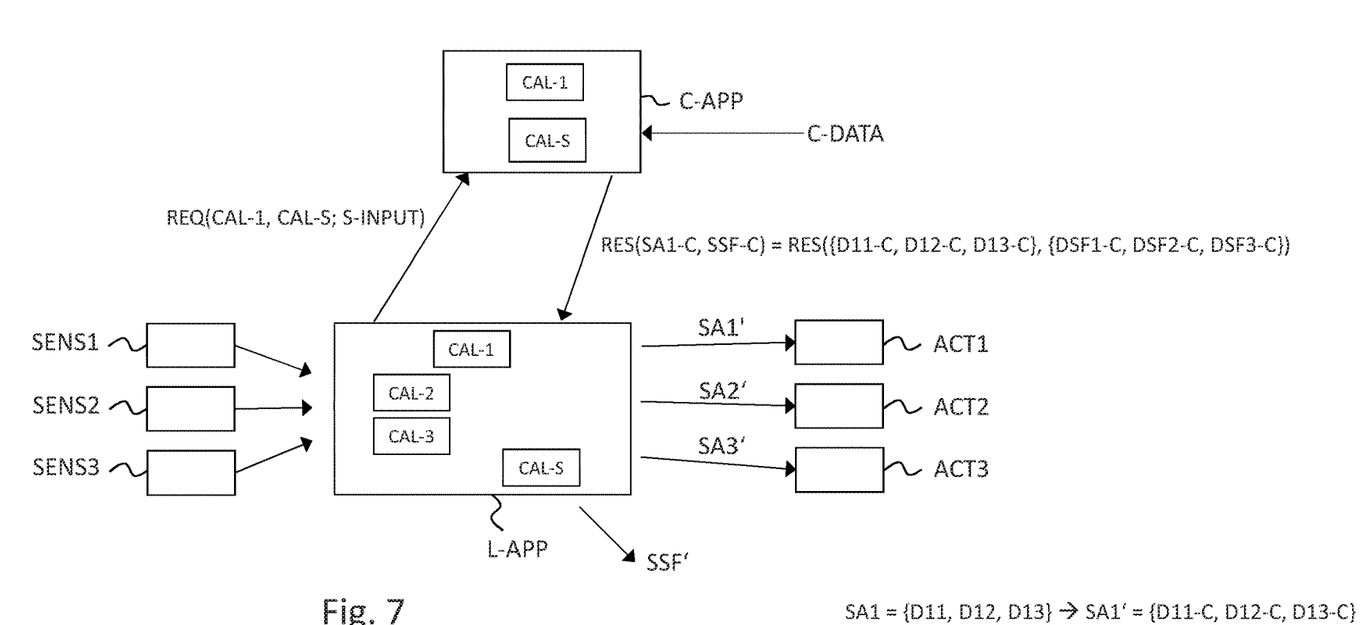

Now, FIG. 7 depicts the case where the local software application L-APP communicates with a cloud application C-APP according to the invention. In the example shown, the local application sends a request REQ to the cloud application C-APP. The request REQ contains the calculations which the cloud application C-APP is requested to execute and specific input S-INPUT, based on which the cloud application has to use to for the execution of the calculations.

In this example, the request REQ=REQ(CAL-1, CAL-S; S-INPUT) requests the cloud application to execute the first and the fourth calculation CAL-1, CAL-S to generate control data for the first actuator ACT1 and control data for bringing the local machine into a safe state.

The specific input S-INPUT may be identical to the complete input used by the local software application L-APP or may comprise only data, in particular sensor data, which are relevant for the requested calculations and/or for bringing the local machine into a safe state.

According to the request REQ the cloud application C-APP executes the first and fourth calculations CAL-1, CAL-S. In addition to the specific input S-INPUT provided by the request REQ the cloud application C-APP may also take cloud data C-DATA into account, if such cloud data are available.

The cloud application C-APP sends the results of the calculations as a response RES to the local application L-APP. The response RES may consist of only one message or may be transmitted with two or more messages.

The response RES contains a set SA1-C of control data for the first actuator ACT1 and control data SSF-C for the safe state.

Assuming that the control data provided by the cloud application C-APP arrive in time at the local software application L-APP and are within the safe parameter range, the local software application will use these—now safe—control data of the cloud application for controlling and/or supervising the local machine in that said safe control data (in this case the control data for the first actuator ACT1) are provided instead (as shown) or in addition (not shown) to the corresponding safe control data of the local application L-APP to the actuator ACT1.

In this simple, not restricting example the response RES contains, as shown in FIG. 7, the set SA1-C of control data D11-C, D12-C, D13-C for the first actuator ACT1 and the set SSF-C of control data DSF1-C, DSF2-C, DSF3-C for a safe state.

Figure 7A:
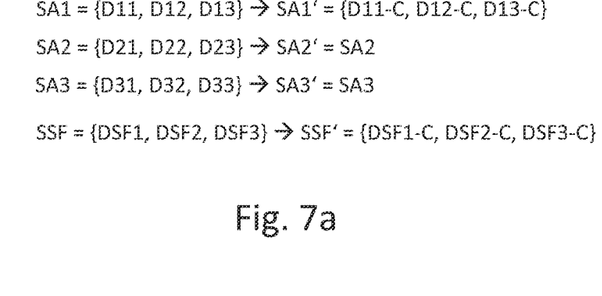

In the example shown the local application L-APP according to FIG. 7a replaces the safe control data which it has calculated by the control data delivered by the cloud application (which are classified as safe control data), so that the resulting sets of safe control data are as follows:

$$SA1 \to SA1' = \{D11\text{-}C, D12\text{-}C, D13\text{-}C\}$$

$$SA2 \to SA2' = SA2 = \{D21, D22, D23\}$$

$$SA3 \to SA3' = SA3 = \{D31, D32, D33\}$$

$$SSF \to SSF' = \{DSF1\text{-}C, DSF2\text{-}C, DSF3\text{-}C\}$$

In this example, the set of control data for the first actuator ACT1 is identical to the set SA1-C provided by the cloud application, and the set for the safe state SSF' is identical to the set SSF-C provided by the cloud application.

The sets for the second and third actuator remain the sets calculated by the local application L-APP, since the cloud application C-APP has not been requested to execute a second and third calculation.

Figures 8, 8A:
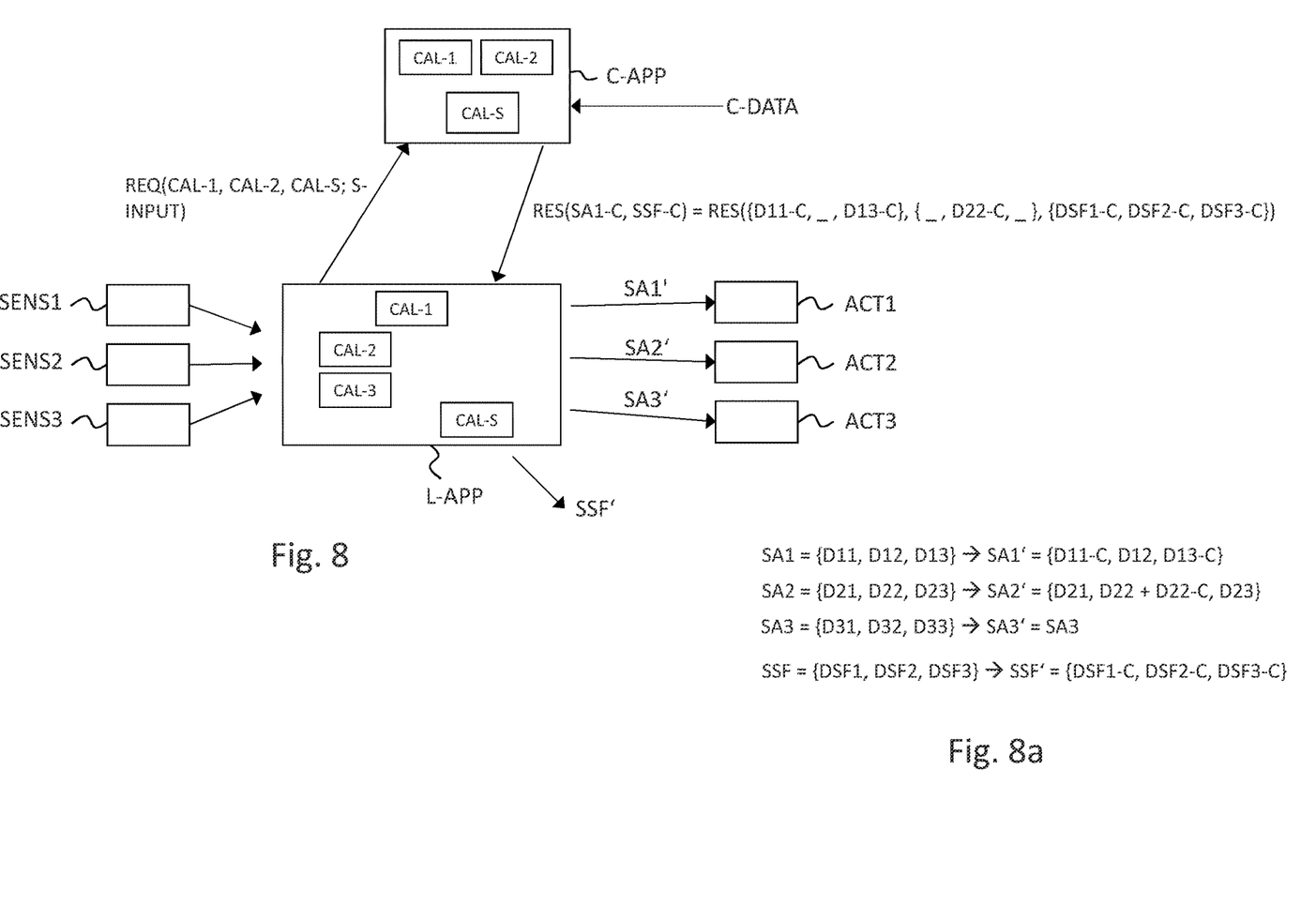

FIGS. 8 and 8*a* show a further example. This example differs from the example shown in FIGS. 7 and 7*a* in that according to FIG. 8 the request REQ contains a further calculation, namely the second calculation CAL-2, and that the set of control data calculated by the cloud application C-APP for the first actuator ACT1 contains only control data D11-C and D13-C, but no control data D12-C. Control data D12-C may not have been calculated by the calculation CAL1 on the cloud application, the may have arrived at the local application too late or they may have been qualified as unsafe. In the example it is assumed that said control data D12-C have not been calculated in the cloud application so that they are not included in the response RES, however the result is the same if they have not been calculated or received too late etc.

Calculation CAL-2 executed in the cloud application only delivers control data D22-C for the second actuator ACT2.

In this example, the resulting SA1' comprises the safe control data D11-C, D13-C calculated by the cloud application, whereas due to the absence of control data D12-C, control data D12 calculated by the first calculation CAL1 on the local application are used:

$$SA1'=\{D11\text{-}C, D12, D13\text{-}C\}$$

The second set SA2' of safe control data for the second actuator ACT2 comprises the locally calculated safe control data D21, D23. Locally calculated safe control data D22 in this example are not replaced but are used "in addition" to the safe control data D22-C calculated by the cloud application C-APP. It is obvious for a person skilled in the art that in this case the safe control data are not simply added but merged in way depending on the specific application:

$$SA2'=\{D21, D22+D22\text{-}C, D23\}$$

The sets SA3' and SSF' are identical to the sets from the example according to FIGS. 7/7*a*.

The invention claimed is:

1. A method to generate safe control data to control a local machine (L-MACH) comprising a technical apparatus comprising a vehicle comprising an automobile, the method comprising:
    assigning a safe device (S-DEV) to the local machine (L-MACH), wherein said safe device comprises a safe hardware device, which safe device (S-DEV) is provided with input data related to the local machine (L-MACH),
    wherein said safe device (S-DEV) comprises a local software application (L-APP), which is executed on the safe hardware device of the safe device (S-DEV), wherein said local software application is a safe software application, which local software application (L-APP) executes calculations based on said input data to generate said safe control data, which safe control data are control data being in accordance with safety requirements for the local machine (L-MACH),
    wherein at least one software application in the cloud comprising a "cloud application" (C-APP) is provided, which at least one cloud application (C-APP) is a software application which is executed on a hardware external to the safe device (S-DEV) external to the local machine (L-MACH),
    wherein said at least one cloud application (C-APP) is configured to execute calculations to generate control data for controlling the local machine (L-MACH) based on specific input data provided by the local software application (L-APP) to the at least one cloud application (C-APP),
    wherein the local software application (L-APP) sends a request in one or more request messages to the at least one cloud application (C-APP), wherein said request comprises
        information about which one or more defined calculations are to be executed by the at least one cloud application, and
        said specific input data, which is to be used by the at least one cloud application (C-APP) for the execution of the one or more defined calculations,
    wherein if the local software application (L-APP) and/or the safe device (S-DEV) receives control data of the one or more requested defined calculations within a defined period of time or before a defined point in time from the at least one cloud application (C-APP), it is checked by the local software application (L-APP) or by the safe device (S-DEV) by a checking software executed on the safe hardware device of the safe device (S-DEV), if said control data are within a safe parameter range,
    wherein if said control data are within the safe parameter range, the control data are qualified as safe control data and will be used to control the local machine (L-MACH) in addition to or instead of the safe control data generated by the calculations executed by the local software application (L-APP),
    wherein if said control data are not within the safe parameter range, said control data will not be qualified as safe control data and will not be used to control the local machine (L-MACH) and only the safe control data generated by the calculations executed by the local software application (L-APP) are used to control the local machine, and
    wherein control data provided by the at least one cloud application (C-APP), which are not received by the local software application (L-APP) and/or the safe device (S-DEV) within the defined period of time or before said defined point in time will not be used to control the local machine (L-MACH), and only the safe control data generated by the calculations executed by the local software application (L-APP) are used to control the local machine.

2. The method according to claim 1, wherein for each defined calculation a specific defined period of time or a specific defined point in time is provided, or wherein only one defined period of time is provided for all calculations.

3. The method according to claim 1, wherein the safe parameter range is calculated by the local software application (L-APP) based on the input data related to the local machine (L-MACH).

4. The method according to claim 1, wherein the local software application (L-APP) or the safe device (S-DEV) comprising a checking software, checks for each requested defined calculation separately if the calculation results are within the safe parameter range.

5. The method according to claim 1, wherein the at least one cloud application (C-APP) is configured to execute all of the calculations which can be executed by the local application (L-APP).

6. The method according to claim 1, wherein control data or all control data provided by a specific calculation of the at least one cloud application, which are qualified as safe control data, are used instead of results of a corresponding calculation executed on the local software application (L-APP), and/or
wherein control data or the control data provided by a specific calculation of the at least one cloud application, which are qualified as safe control data, are used in addition to some or all of the results of the corresponding calculation executed on the local application (L-APP).

7. The method according to claim 1, wherein the input data related to the local machine and/or the specific input data comprises:
sensor data from one or more sensors (e.g., cameras, radars, lidars, . . . ) monitoring the surrounding of the local machine;
sensor data from one or more sensors (e.g., cameras, radars, lidars, . . . ) monitoring the local machine and/or monitoring processes being executed on the local machine; and/or
data describing the state of the local machine being provided by one or more actuators of the local machine, subsystems of the local machine, or configuration data of the local machine,
wherein the specific input data is identical to the input data related to the local machine or comprises all input data related to the local machine or the specific input data is a proper subset of said input data related to the local machine.

8. The method according to claim 1, wherein the specific input data comprises information about the safe device (S-DEV) and/or about the local software application (L-APP) about the type of local application.

9. The method according to claim 1, wherein two or more cloud applications are provided, which are configured to execute different calculations, wherein a request message is routed to a defined cloud application according to the specific input data contained in the request message with respect to information about the safe device (S-DEV) and/or the local software application (L-APP).

10. The method according to claim 1, wherein a cloud application (C-APP) is a software application which is connected to the local software application (L-APP) via the Internet.

11. The method according to claim 1, wherein as answer to a request message of a local software application (L-APP) or a cloud application (C-APP) sends a response in form of one or more response message(s) to the local software application (L-APP), wherein said response comprises the control data of the defined calculations requested by the local software application (L-APP), wherein a response message from a cloud application (C-APP) contains information which indicates if this is the final message of the cloud application (C-APP) or if the cloud application intends to send one or more additional response messages.

12. The method according to claim 1, wherein control data, which are received by a partial response from the cloud application (C-APP) will be used by the local software application (L-APP) and/or the safe device (S-DEV) to control and/or supervise the local machine (L-MACH), if said control data are qualified as safe control data.

13. The method according to claim 1, wherein the cloud application (C-APP) is notified by a termination message, which is sent by the requesting local software application (L-APP), that no further calculation is required, wherein said termination message includes information about the reason for the termination, such as that the defined time-period has been exceeded and/or that received calculation results are not within the safe parameter range, and/or contains an actual status achieved by the local machine (L-MACH).

14. The method according to claim 1, wherein the cloud application (C-APP) takes additional input comprising additional input data (C-DATA) into account for its calculation(s), wherein said additional input comprising the additional input data (C-DATA) is available for the cloud application but not for the local software application.

15. The method according to claim 1, wherein the external hardware for a cloud application (C-APP) is an unsafe hardware and/or the cloud application is an unsafe software application, and/or wherein the external hardware on which a or the at least one cloud application is executed is more powerful than the safe hardware device and/or the at least one cloud application is more powerful than the local software application.

16. A system (SYS) to generate safe control data to control a local machine (L-MACH) comprising a technical apparatus comprising a vehicle comprising an automobile, wherein the system comprises
a safe device (S-DEV), which is assigned to the local machine (L-MACH), wherein said safe device comprises a safe hardware device, which safe device (S-DEV) is provided with input data related to the local machine (L-MACH),
wherein said safe device (S-DEV) comprises a local software application (L-APP), which is executed on the safe hardware device of the safe device (S-DEV), wherein said local software application is a safe software application, which local software application (L-APP) is configured to execute calculations based on said input data to generate said safe control data, which safe control data for example are control data being in accordance with safety requirements for the local machine (L-MACH),
wherein the system (SYS) further comprises a hardware external to the safe device (S-DEV) external to the local machine (L-MACH), and at least one software application in the cloud is a "cloud application" (C-APP), which at least one cloud application (C-APP) is a software application which is executed on said external hardware, wherein said cloud application (C-APP) is configured to execute calculations to generate control data for controlling the local machine (L-MACH) based on specific input data provided by the local software application (L-APP) to the cloud application (C-APP), and wherein the local software application (L-APP) is configured to send a request, in one or more request messages, to the at least one cloud application (C-APP), wherein said request comprises information about which one or more defined calculations are to be executed by the at least one cloud application, and
said specific input data, which is to be used by the cloud application (C-APP) for the execution of the one or more defined calculations,
wherein the local software application (L-APP) and/or the safe device (S-DEV) is/are configured to receive control data of the one or more requested defined calculations of, wherein if the local software application (L-APP) and/or the safe device (S-DEV) receives control data of the one or more requested defined calculations within a defined period of time or before a defined point in time from the cloud application (C-APP), it is checked by the local software application (L-APP) or by the safe device (S-DEV) by a checking software executed on the safe hardware device of the safe device (S-DEV), if said control data are within a safe parameter range, wherein if said control data are within the safe parameter range, the control data are qualified as safe control data and will be used to control the local machine (L-MACH) in addition to or instead of the safe control data generated by the calculations executed by the local software application (L-APP), wherein if said control data are not within the safe parameter range, said control data will not be qualified as safe control data and will not be used to control the local machine (L-MACH) and only the safe control data generated by the calculations executed by the local software application (L-APP) are used to control the local machine, and wherein control data provided by the cloud application (C-APP), which are not received by the local software application (L-APP) and/or the safe device (S-DEV) within the defined period of time or before said defined point in time will not be used to control the local machine (L-MACH), and only the safe control data generated by the calculations executed by the local software application (L-APP) are used to control the local machine, wherein the external hardware for a cloud application (C-APP) is an unsafe hardware and/or the cloud application is an unsafe software application, and/or wherein the external hardware on which a or the at least one cloud application is executed is more powerful than the safe hardware device and/or the at least one cloud application is more powerful than the local software application.

\* \* \* \* \*